Aug. 19, 1969 E. F. GOURLEY 3,461,525
SELF-INDEXING TURRET
Filed Jan. 8, 1968 5 Sheets-Sheet 1
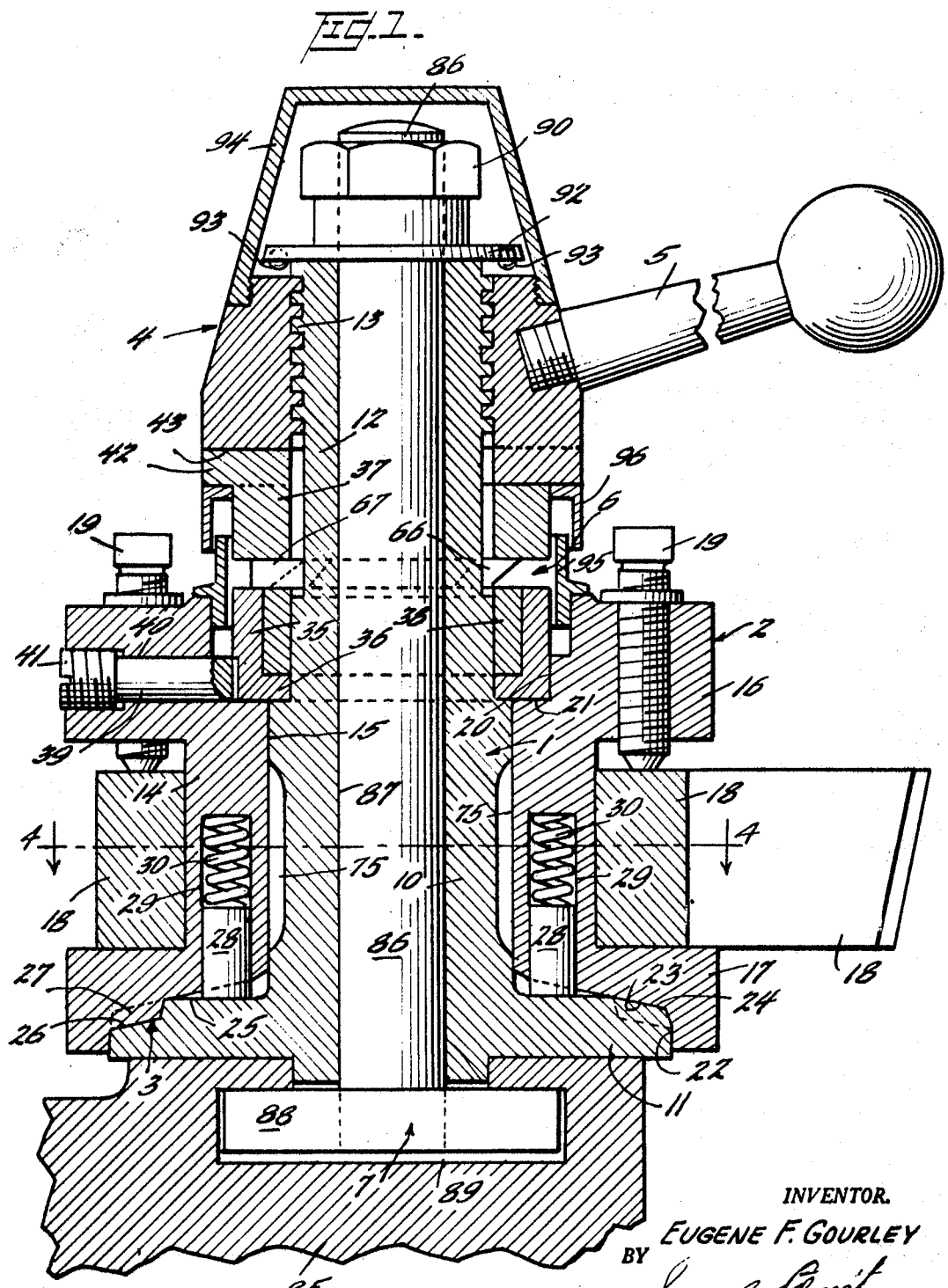
INVENTOR.
EUGENE F. GOURLEY
BY
ATTORNEY

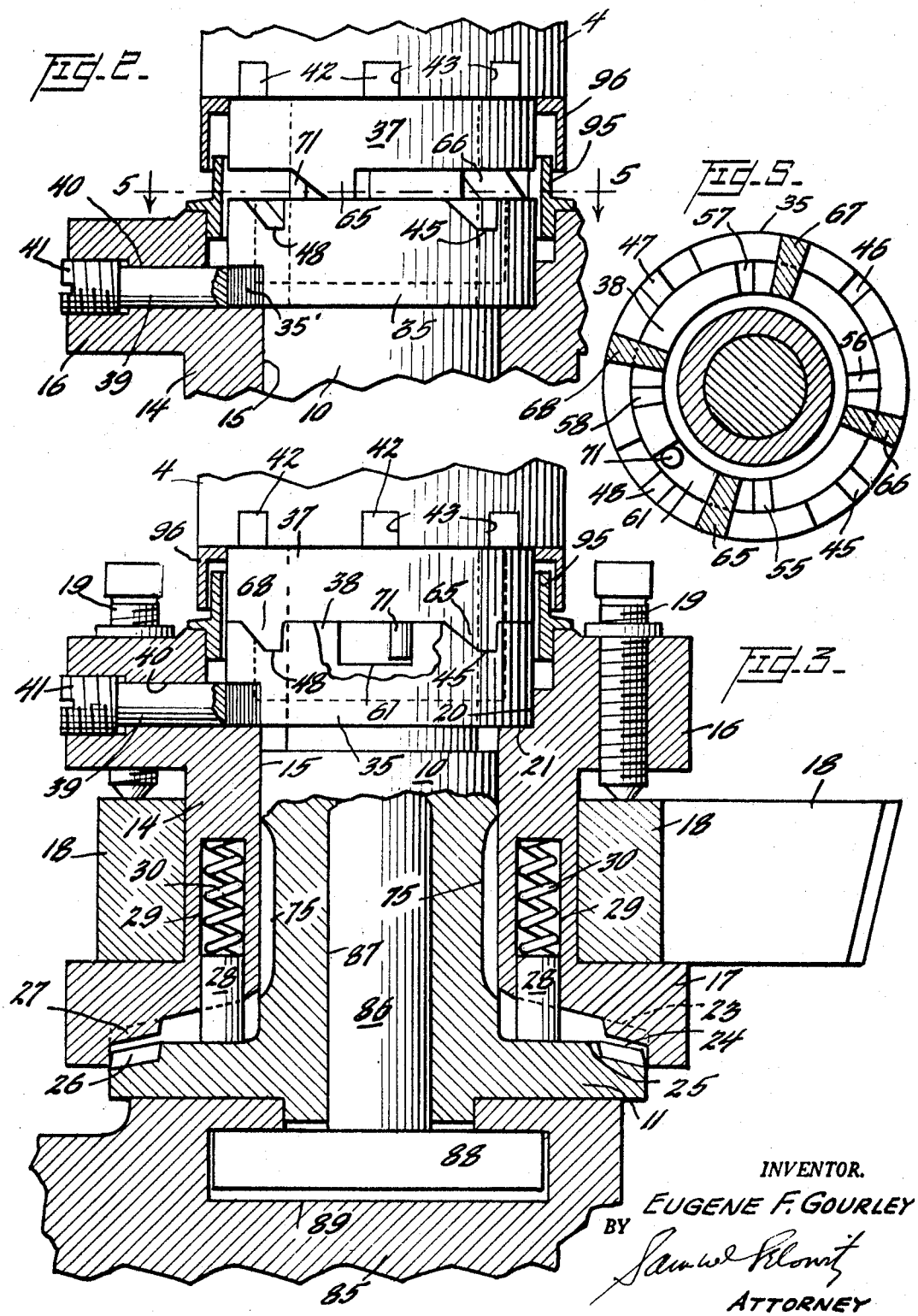

Aug. 19, 1969  E. F. GOURLEY  3,461,525
SELF-INDEXING TURRET
Filed Jan. 8, 1968  5 Sheets-Sheet 3
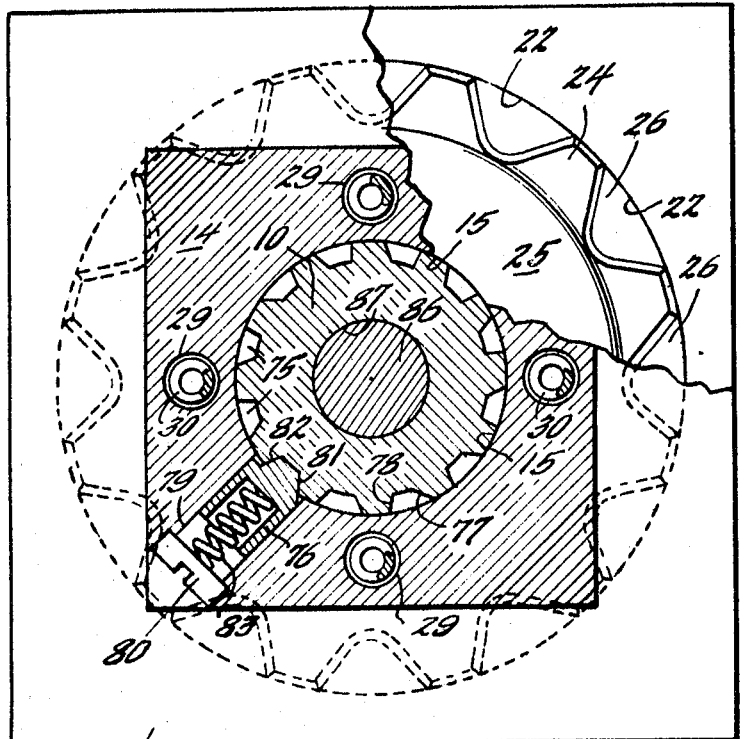
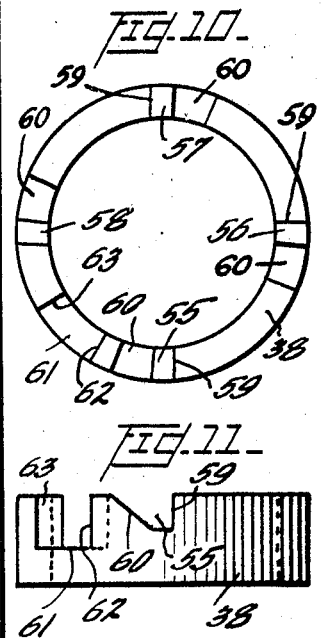
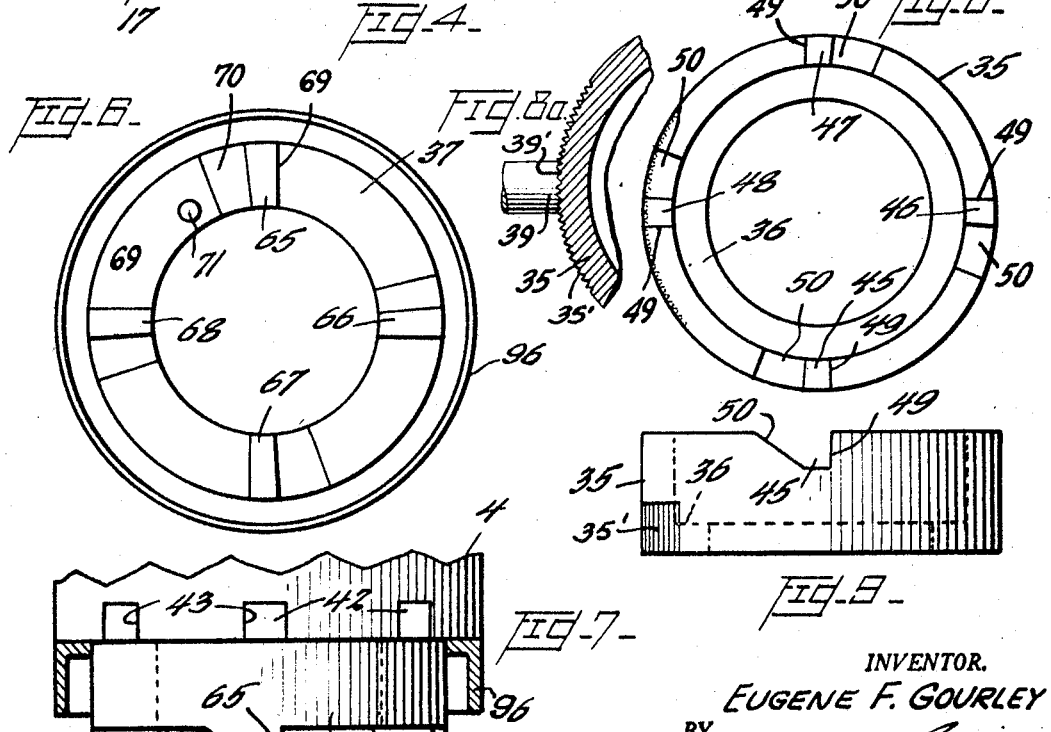
INVENTOR.
EUGENE F. GOURLEY
BY
ATTORNEY

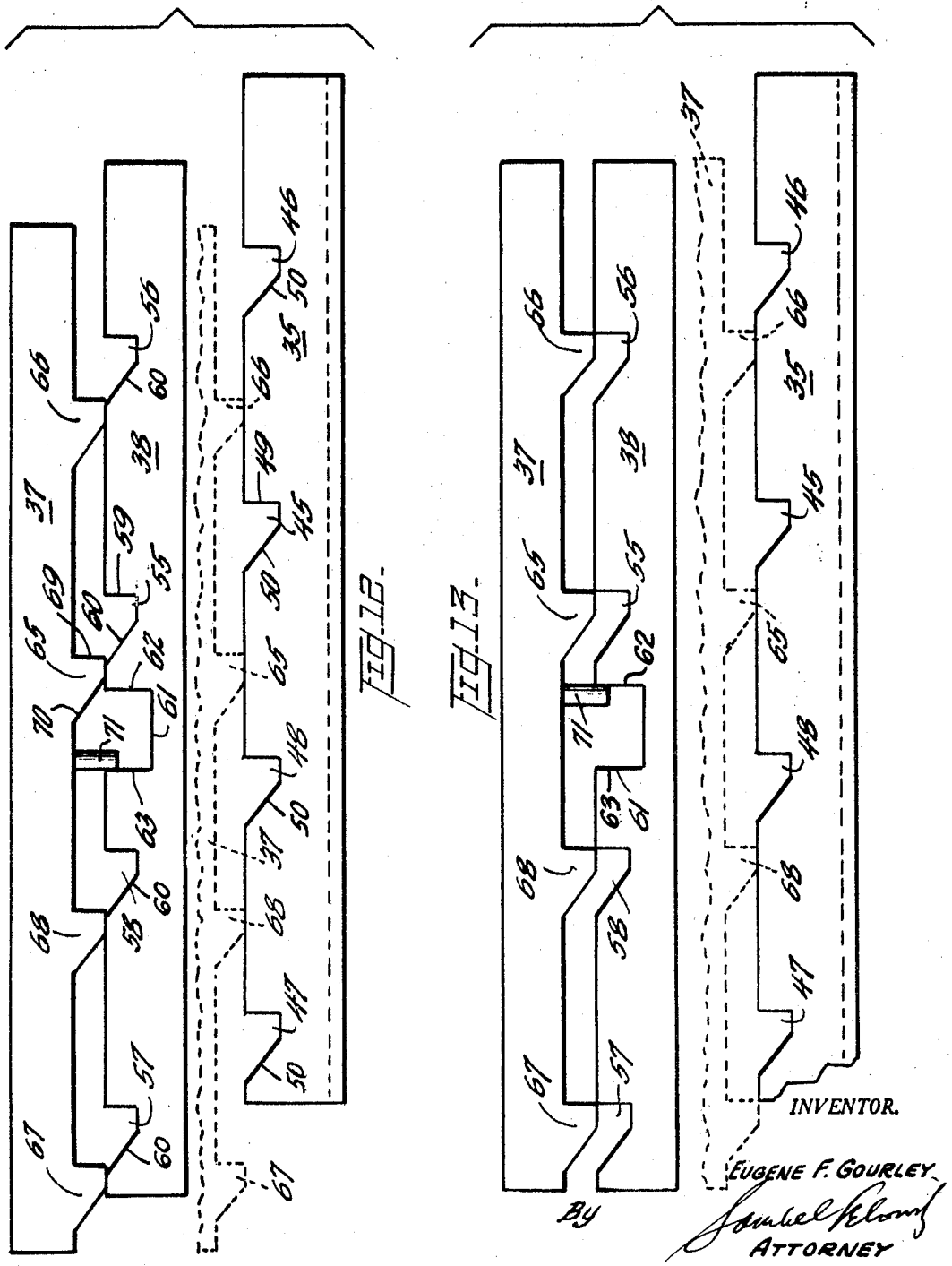

Aug. 19, 1969  E. F. GOURLEY  3,461,525
SELF-INDEXING TURRET
Filed Jan. 8, 1968  5 Sheets-Sheet 5
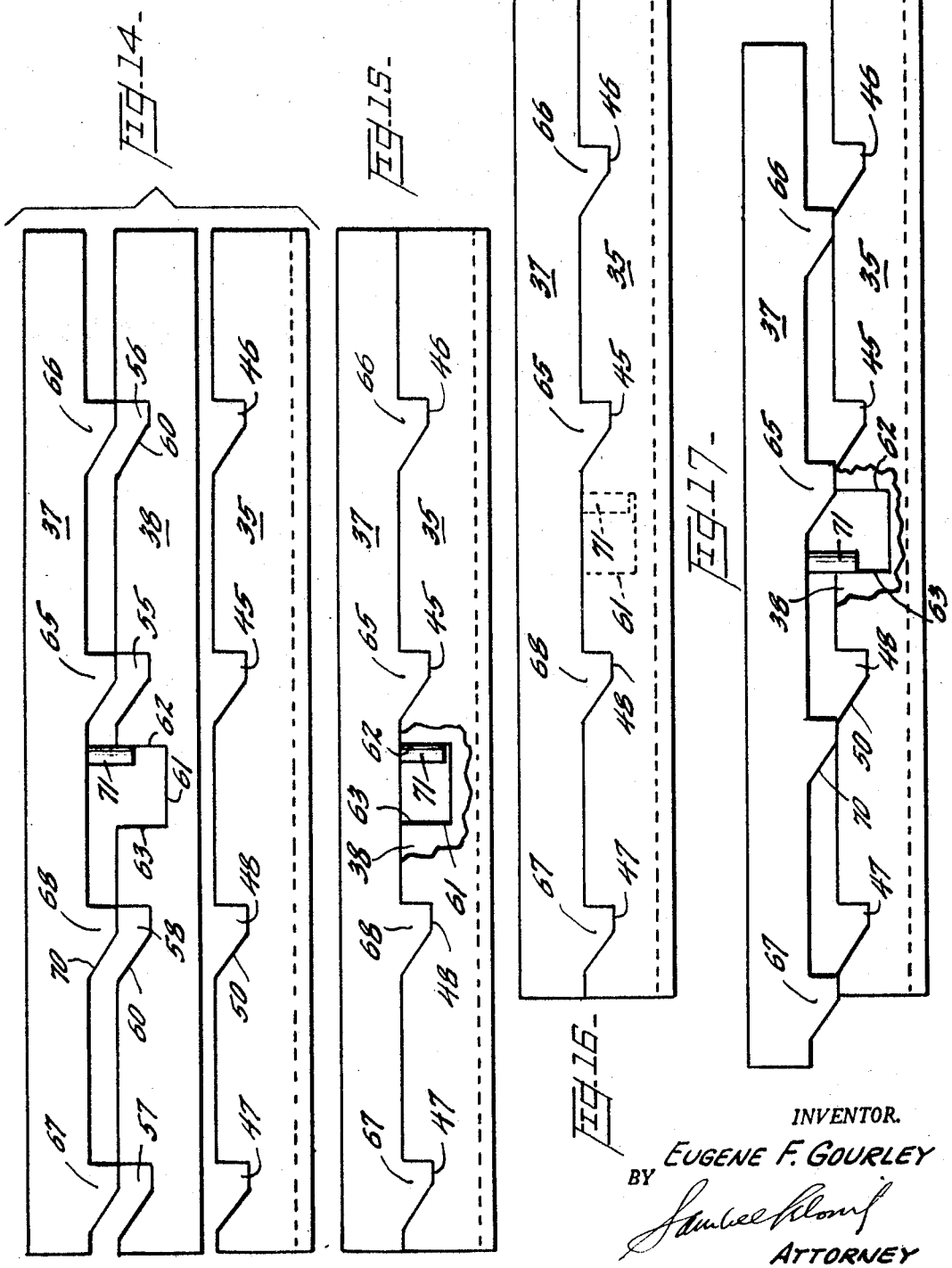
INVENTOR.
EUGENE F. GOURLEY
BY
ATTORNEY United States Patent Office 3,461,525
Patented Aug. 19, 1969

3,461,525
SELF-INDEXING TURRET
Eugene F. Gourley, Meadville, Pa., assignor to McCrosky Tool Corporation, Meadville, Pa., a corporation of Pennsylvania
Filed Jan. 8, 1968, Ser. No. 696,414
Int. Cl. B23b 29/24; B23q 17/00
U.S. Cl. 29—35.5
18 Claims

ABSTRACT OF THE DISCLOSURE

A rugged clutch-controlled adjustable mounting of multiple tool holders of the indexable turret type on a machine tool component in a manner to make possible the ready movement of a selected one of a plurality of cutting tools carried thereby for operation on a workpiece. This rapid and easy movement of tool-carrying turret is executed by a simple to-and-fro movement of the turret-manipulating handle, which in one direction of movement, first releases the turret from its locked position on its mounting column to permit the following movement of the handle to shift the turret to any one of multiple indexed increments. The return movement of the handle serves to lock the turret in its indexed position without disturbing the setting of the latter. More particularly, a clutch assembly, composed of three members, is disposed between the handle and the turret body, and these members are so arranged that a rotation of the handle in one direction, with a possible "throw" of approximately 120°, releases the turret body for rotary movement after approximately 20° and permits indexing thereafter at three points, spaced for example, 30°, 60° and 90° from the previous position. A reverse rotation of the handle locks the turret in its newly indexed position and sets the clutch parts for a repeated cycle of operation. The mountings of the clutch components are so designed as to permit small radial adjustments which compensate for wear of the parts and assure correct positioning of the handle lever at all times.

---

The present invention is a modification and improvement of conventional indexable tool holder turrets which generally comprise a vertically disposed cylindrical column having an outwardly extending circular base about the lower end thereof and a reduced cylindrical extension which extends upwardly from the upper end thereof and is provided with relatively coarse exterior threads. The column is commonly secured to a machine tool such as a lathe by a center bolt having the head thereof disposed in a T-slot of the lathe compound from which it extends upwardly through an axial bore in the column, and is provided with a threaded upper end on which a nut is screwed down into engagement with the reduced upper end of the column thereby securely clamping the column to the bed. A tool holder turret, comprising a central body section having outwardly extending flanges at the upper and lower ends thereof defining between them channels in which the shanks of cutting tools are clamped by set screws in the usual manner, is rotatably mounted on the column. The upper surface of the column base and the lower end of the turret are provided with opposed annular rows of circumferentially spaced teeth or alternately spaced lobes and depressions, which are adapted to be moved into and out of mesh with each other and are operative when in mesh to prevent rotation of the turret upon the column. An internally threaded clamping head, having a handle lever secured thereto is threaded onto the reduced threaded extension of the column. When the clamping head is screwed downwardly upon the column extension it is adapted to engage the upper end of the turret and force it downwardly thereby bringing and maintaining the annular row of teeth or lobes in the lower end thereof into mesh with the opposed annular row of teeth or depressions in the upper surface of the column base; and when the clamping head is screwed upwardly upon the column extension it permits the raising of the turret until the opposed rows of teeth or lobes are out of mesh with each other, after which the turret may be rotated about the column to bring another tool into operative position, and then clamped in adjusted position.

During use when it is desired to index the turret to bring a new tool into operative position, the operator first, by rotating the handle lever in one direction, screws the clamping head upwardly a sufficient distance to permit raising the turret out of locking engagement with the column base. He then manually rotates the turret body about the column until the selected tool is in operative position, after which he actuates the handle lever in the reverse direction to screw the clamping head back down, thereby simultaneously lowering the turret and firmly clamping it in locked position. Indexable tool holder turrets of this general type, while satisfactory in operation, all have the inherent disadvantage that a great deal of labor time is lost by the machinist in unclamping the turret, indexing it to a new position, and reclamping it in indexed position.

It is therefore the principal object of the present invention to provide means in a tool holder turret of the aforesaid general character in which the unlocking of the turret, the indexing thereof to bring another tool into operative position with respect to a workpiece, and the re-locking of the turret in indexed position are all accomplished by a back and forth movement of the handle lever, whereby the shifting of the tool holder turret between index positions is greatly simplified and is accomplished with a minimum of effort.

To this end a clutch mechanism is provided between the clamping head and the turret which is so constructed and arranged that movement of the handle lever, and with it the clamping head, in one direction, will effect the unlocking and indexing of the turret to a new position, and the movement thereof in the opposite direction will effect the re-locking of the turret in indexed position.

Another object of the invention is to provide in an indexable tool holder turret a clutch mechanism of the aforesaid character which is of simple, sturdy construction, is accurate in operation, and is relatively inexpensive to manufacture.

It is another object of the invention to provide a clutch assembly which permits an adjustment of its setting to compensate for wear of the parts. This adjustment also makes possible any desired correction for the positioning of the handle lever for maximum safety and convenience of the machine operator.

Applicant is aware that various indexable tool holder turrets having incorporated therein clutch mechanisms through which indexing and locking of the turret are effected have been designed. Patents Nos. 2,505,684, Apr. 25, 1950, and 2,547,616, Apr. 3, 1951, are illustrative of such. But all such clutch mechanisms, of which applicant is aware, are of such complicated construction that they are likely to get out of order during operation, and are quite expensive to manufacture.

Having stated the principal objects of the invention, other and more limited objects thereof will be apparent from the following specification and the accompanying drawings forming a part thereof in which:

FIG. 1 is a central vertical section through a multiple tool holder of the indexible turret type constructed according to my invention in which the various elements thereof are shown in turret locking position;

FIG. 2 is a fragmentary detail view showing the clutch mechanism in side elevation in turret locking position, and the upper end of the turret in section;

FIG. 3 is a central vertical sectional view showing the turret and the clutch mechanism in unlocked position preparatory to indexing, the clutch mechanism being shown in side elevation;

FIG. 4 is a horizontal section taken on the line 4—4 of FIG. 1, with the cutting tools omitted therefrom;

FIG. 5 is a horizontal section through the clutch mechanism, as shown in FIG. 2, the plane of the section being indicated by the line 5—5 on FIG. 2;

FIG. 6 is a bottom plan view of the upper clutch ring;

FIG. 7 is a side elevation of the upper clutch ring as shown in FIG. 6;

FIG. 8 is a top plan view of the lower clutch ring;

FIG. 8a is a horizontal sectional view through a portion of the lower clutch ring above the locating plunger cooperating therewith;

FIG. 9 is a side elevation of the lower clutch ring as shown in FIG. 8;

FIG. 10 is a top plan view of the intermediate clutch ring;

FIG. 11 is a side elevation of the intermediate clutch ring as shown in FIG. 10; and FIGS. 12 to 17 inclusive each show developments of the three clutch rings and diagrammatically illustrate the operation of the clutch mechanism in unlocking the turret, indexing it and re-locking it in indexed position.

The presently preferred embodiment of the invention, as shown in the drawings, comprises generally a central vertically disposed hollow column or support 1, an indexable tool carrying turret 2 which is mounted on the support 1 for rotary and vertical movement thereon, a locking mechanism 3 by which the turret is releasably locked in indexed operative position to the support 1, an internally threaded clamping head 4 which is screwed onto the upper threaded end of the support 1 and is provided with an actuating handle lever 5, a clutch mechanism, generally indicated by the numeral 6, which is interposed between the turret 2 and the clamping head 4 upon the support 1, and through which the turret 2 is unlocked from the support 1, indexed to a new position, and relocked in indexed position by the rotary back and forth movement of the clamping head 4 upon the threaded upper end of the support 1, and mounting means, generally indicated by the numeral 7, by which the tool holder is adapted to be secured in fixed position on a machine tool slide or compound.

The support 1 comprises a lower cylindrical pivot section 10 having an outwardly extending annular base 11 about the lower end thereof, and a reduced cylindrical upper section 12 which is provided with relatively coarse right hand screw threads 13 about the upper end thereof for the reception of the clamping head 4.

The turret 2 comprises a square hub 14 having a central vertical bore 15 by which the turret is mounted upon the pivot section 10 of the support 1 for rotary and vertical sliding movement thereon. The hub 14 is provided with an integral outwardly extending flange 16 about the upper end thereof and a similar outwardly extending flange 17 about the lower end thereof between which a plurality of cutting tools 18 are adapted to be removably secured by set screws 19 carried by the upper flange 16. The upper end of the hub 14 is provided with a downwardly extending cylindrical recess 20 about the upper end of the bore 15 with an annular square shoulder 21 between the upper end of the bore 15 and the lower end of the recess 20. The lower end of turret 2 is provided with an upwardly extending annular recess 22 for the reception of the base 11. The recess 22 terminates in a conical wall 23 which is adapted to seat on a complementary inclined ring shaped surface 24 formed on the upper side of the annular base 11 adjacent the periphery thereof and which merges with a flat horizontal ring shaped surface 25 which extends outwardly from the lower end of the pivot section 10.

The locking mechanism 3, by which the turret 2 is releasably locked against rotation in indexed position to the support 1, comprises a plurality of equally spaced semi-circular notches 26 which are formed in the inclined ring shaped surface 24 of the base 11, and a like number of semi-circular lugs or lobes 27 which extend downwardly from the conical wall 23 of the recess 22, adjacent the periphery thereof, and are adapted to seat in the complementary notches or depressions 26 when the turret 2 is depressed downwardly into locking position as shown in FIG. 1. The notches 26 and lugs 27 are preferably spaced 30° apart which will permit indexing of the turret 2 in multiples of 30° as will be explained hereinafter.

The turret 2 is normally yieldingly biased upwardly, on the pivot section 10 of the support 1, out of locking position, as shown in FIG. 1, to the unlocked position as shown in FIG. 3, by a plurality of spring pressed plungers 28. The plungers 28 are slidably mounted in the lower ends of upwardly extending bores 29 in the turret 2 and are urged downwardly therefrom into engagement with the flat ring shaped surface 25 of the base 11 by helical compression springs 30 which are mounted in bores 29 between the plungers 28 and the upper ends of the bores 29.

The clutch mechanism, which is disposed about the upper section 12 of the support 1 between the upper end of the turret 2 and the lower end of the clamping head 4, comprises a lower cylindrical clutch ring 35 having an inwardly extending annular flange 36 about the lower end thereof, an upper cylindrical clutch ring 37 and an intermediate cylindrical clutch ring 38. The lower clutch ring 35 (FIGS. 8 and 9), is mounted in the recess 20, in the upper end of the turret 2, and is seated upon the annular shoulder 21 between the upper end of the turret bore 15 and the lower end of the recess 20. It is adjustably secured in fixed position in the recess 20 by a locating plunger 39 which is slidably mounted in a transverse bore 40, in the upper flange 16 of the turret, and is forced into gripping engagement with the lower clutch ring 35 by a screw plug 41 which is threaded into the outer end of the bore 40. As shown in FIGS. 1, 2, 3, 8, 8a and 9, the lower portion of the external lateral surface of the lower clutch ring is provided with vertical serrations 35' for a portion of its periphery, for example, a sector of 90°. The end of plunger 39 is fitted with corresponding vertical serrations 39' which interlock with serrations 35' when screw plug 41 is screwed in against its opposite end. A longitudinal guide slot (not shown) along the top of plunger 39 may cooperate with a retractable pin extending into the slot (not shown), to permit a separation between the interlocking serrations preparatory to angular shifting of the lower clutch ring 35 relative to the upper clutch ring 37 for purposes of adjustment, more fully described below.

The upper clutch ring 37 is rigidly secured to the lower end of the clamping head 4 in any desired manner for movement therewith. As shown in FIGS. 1 to 3 and 7, radial tongues 42 on the upper end of the clutch ring 37 are interdigitated with corresponding radial slots 43 in the lower end of the clamping head 4. An angular shifting of the clutch ring 37 at the bottom of the clamping head by displacing the tongues 42 in the slots 43, serves to modify the positions of the camming members in the upper clutch ring 37 relative to those of the lower and intermediate clutch rings 35 and 38, but the adjustment afforded by this expedient is not as fine as that afforded by a shift of the clamped area of the clutch ring 35 relative to the serrated end of locating plunger 39, by means of the interengaging serrations 35′ and 39′. Either mode of adjustment makes possible a compensation for wear of the clutch parts as well as a correct positioning of the handle lever, which in most instances approximately bisects the corner of the turret body on the right of the operator as he faces the machine or compound rest.

The intermediate clutch ring 38 is rotatably mounted within the lower clutch ring 35 with the lower end thereof seated upon the flange 36 and the upper end thereof flush with the upper end of the lower clutch ring 35 as shown in FIG. 1. The thickness of the cylindrical wall of the upper clutch ring is equal to the combined thickness of the cylindrical walls of the lower and intermediate clutch rings, as is also shown in FIG. 1.

The upper edge of the lower clutch ring 35 is provided with four similar indentations 45, 46, 47 and 48 which are spaced 90° apart, and each of which has a vertically disposed square shoulder 49 and an upwardly and rearwardly inclined surface 50.

The upper edge of the intermediate clutch ring 38 is provided with four indentations 55, 56, 57 and 58 which are similar in size, shape, and spacing to the indentations 45, 46, 47 and 48 in the upper edge of the lower clutch ring 35, and each of which has a vertically disposed square shoulder 59 and an inclined surface 60. The intermediate clutch ring 38 is also provided, between the indentations 55 and 58, with a rectangular slot 61 having the leading and trailing end walls 62 and 63.

The upper clutch ring 37 is provided with four downwardly extending cam lugs 65, 66, 67 and 68 which are complementary, in size, shape, and spacing, to the indentations in the upper edges of the lower and intermediate clutch rings, and each of which has a vertically disposed square shoulder 69 and an inclined cam surface 70. The upper clutch ring 37 is also provided, between the cam lugs 65 and 68, with a pin 71 which extends downwardly therefrom into the rectangular slot 61 in the intermediate clutch ring 38, thereby providing a lost motion connection between the upper clutch ring 37 and the intermediate clutch ring 38. During indexing of the turret 2 upon the support 1 by the back and forth movement of the clamping head 4, the indentations 55 to 58 in the upper edge of the intermediate ring 38 are adapted to be moved into and out of radial side by side alignment with the indentations 45 to 48 in the lower clutch ring 35; and the cam lugs 65 to 68 on the upper clutch ring 37 are adapted to be moved into and out of engagement with the radially aligned indentations in the intermediate and lower clutch rings.

The operation of the clutch mechanism 6 in unlocking the turret from the base 11 of the support 1, the indexing of the turret to a new position, and the relocking of it to the base 11 in the newly indexed position, will now be described in connection with FIGS. 12 to 17 inclusive, in which the relative positions of the clutch rings, and the indentations and cam lugs carried thereby, with respect to each other during the various stages of the turret unlocking, indexing, and relocking operation are diagrammatically illustrated.

FIG. 12 shows the relative positions of the clutch rings 35, 37 and 38 with respect to each when in turret locking position after the clamping head 4, and upper clutch ring 37 carried thereby have been turned clockwise to the limit of their movement on the threaded upper end 12 of the support 1. In this position the indentations 55 to 58 in the upper edge of the intermediate clutch ring 38 are out of radial alignment with the indentations 45 to 48 in the upper edge of the lower clutch ring 35; the downwardly extending pin 71 carried by the upper clutch ring 37 is disposed in contact with the trailing end wall 63 of the slot 61 in the intermediate clutch ring 38; and the cam lugs 65 to 68 carried by the upper clutch ring 37 are disposed in engagement with the upper edges of both the lower and intermediate clutch rings 35 and 38 thereby forcing the turret 2 downwardly against the base 11 with the locking lugs or lobes 27 carried by the turret seated in the notches 26 formed in the upper surface of the base 11, as shown in FIGS. 1, 2 and 5.

During the initial movement of the clamping head 4 and upper clutch ring 37 counter-clockwise out of locking position, as shown in FIG. 12, to the position shown in FIG. 13, the intermediate clutch ring 38 will remain stationary within the lower clutch ring 35, while pin 71 carried by the upper clutch ring 37 is being moved out of engagement with the trailing end 63 of the slot 61, in the intermediate clutch ring 38, into engagement with the leading end 62 thereof; and the cam lugs 65 to 68 carried by the upper clutch ring 37 will be moved into vertical alignment with the indentations 55 to 58 in the upper edge of the intermediate clutch ring 38 while still remaining in engagement with the upper edge of the lower clutch ring 35.

During further counter-clockwise movement of the clamping head 4 and upper clutch ring 37 from the position shown in FIG. 13 to the position shown in FIG. 14 the intermediate clutch ring 38 will be carried along with the upper clutch ring 37, due to the engagement of the pin 71 with the leading end 62 of the slot 61, until the indentations 55 to 58 in the upper edge of the intermediate clutch ring 38 are in side by side radial alignment with the indentations 45 to 48 in the lower clutch ring 35, and the cam lugs 65 to 68 carried by the upper clutch ring 37 are in vertical alignment with the indentations in both the intermediate and lower clutch rings, in which position the cam lugs 65 to 68 are out of engagement with the upper edges of both the intermediate and lower clutch rings.

As soon as the upper and intermediate clutch rings reach the position shown in FIG. 14 the springs 30 will force the turret 2 upwardly on the support 1 until the upper edges of the lower and intermediate clutch rings engage the lower edge of the upper clutch ring with the cam lugs 65 to 68 on the upper clutch ring 37 disposed in both the indentations 45 to 48 in the upper edge of the lower clutch ring 35 and the indentations 55 to 58 in the upper edge of the intermediate clutch ring 38, as shown in FIGS. 15 and 3. In this position of the turret 2 and clutch rings 35, 37 and 38, the locking lugs 27 carried by the turret 2 are withdrawn from the locking notches 26 formed in the base 11, thereby unlocking the turret 2 from the support 1 and permitting indexing thereof.

During the subsequent counter-clockwise movement of the clamping head 4 and upper clutch ring 37, the intermediate clutch ring 38 and lower clutch ring 35 are carried along with the upper clutch ring 37 from the position shown in FIG. 15 to the position shown in FIG. 16, thereby indexing the turret 2 to bring a new tool 18 into operative position with respect to a workpiece. As described below the provision of index grooves 75 around the periphery of the column 10, spaced 30° from each other, makes possible the indexing of the turret body to one of three positions, 30°, 60°, or 90° displaced from its previously set position. If the choice is 90°, the handle lever 5 is turned as far as possible, approximately 120°, when the clamping head abuts against the overlying stop washer. A small throw of the handle in a counterclockwise direction results in indexing at 30° and 60° displacements.

In order to relock the turret in indexed position the clamping head 4 and upper clutch ring 37 are rotated clockwise from the position shown in FIG. 16 back to the position shown in FIG. 12. During the initial clockwise movement of the clamping head 4 and the upper clutch ring 37 from the position shown in FIG. 16 to the position shown in FIG. 17 the pin 71, carried by the upper clutch ring 37, is moved out of engagement with the leading end 62 of the slot 61 in the intermediate clutch ring 38 into engagement with the trailing end 63 thereof, and the lower and intermediate clutch rings are forced downwardly from the position shown in FIG. 16 to the position shown in FIG. 17 by the engagement of the cam surfaces 70, of the cam lugs 65 to 68, with the complementary inclined surfaces 50 and 60 of the indentations 45 to 48 of the lower clutch ring 35 and the indentations 55 to 58 of the intermediate clutch ring 38, respectively. During the further clockwise movement of the upper clutch ring 37 from the position shown in FIG. 17 to the position shown in FIG. 12 the intermediate clutch ring 38 is carried along with the upper clutch ring 37, with the cam lugs 65 to 68 in engagement with the upper edge of the intermediate clutch ring 38, thereby moving the indentations 55 to 58 in the intermediate clutch ring 38 out of alignment, or register, with the indentations 45 to 48 in the lower clutch ring 35. The location of the pin 71 on the upper clutch ring 37 with respect to the cam lug 65 thereon, and the location of the leading and trailing ends of the slot 61 in the intermediate clutch ring 38 with respect to the indentation 55 therein, are such as to prevent the cam lugs 65 to 68 of the upper clutch ring 37 from simultaneously spanning the indentations 45 to 48 in the lower clutch ring 35 and the indentations 55 to 58 in the intermediate clutch ring 38 during the clockwise movement of the clamping head 4 and upper clutch ring 37 back from the indexed position shown in FIG. 16 to the clamped locked position shown in FIGS. 12, 1 and 2. The rotary clockwise movement of the clamping head 4 and upper clutch ring 37 from the position shown in FIG. 16 to the position shown in FIG. 17 moves the turret 2 downwardly upon the support 1 until the locking lugs 27 on the lower end of the turret enter the locking notches 26 in the upper surface of the base 11; and the combined rotary and downward movement of the clamping head 4 on the threads 13 of the support 1 between the position shown in FIG. 17 and the position shown in FIG. 12 firmly clamps the turret 2 down against the base 11.

The pivot section 10 of the support 1 is provided with a plurality of similar index grooves 75, and the turret 2 is provided with a cooperating index plunger 76 to facilitate the stopping of the turret 2 in correct position as it is indexed counterclockwise from one position to another (FIGS. 3 and 4), and to prevent the return clockwise movement of the turret from indexed position along with the clamping head 4 and the upper clutch ring 37 as they are rotated clockwise back from indexed position, as shown in FIG. 16, to clamped locking position, as shown in FIG. 12.

The index grooves 75 are spaced 30° apart around the periphery of the pivot section 10 and are disposed in radial alignment with the locking notches or lobes 26 formed in the upper surface of the base 11. The forward or right hand end of each of the grooves is constituted by a gradually inclined cam surface 77, and the rear or left hand end thereof is constituted by a steeply inclined shoulder 78. These surfaces may be 45° and 10°, respectively, relative to a central vertical plane extending through the pivot section.

The index plunger 76 is slidably mounted in a bore 79, in the turret 2, which is disposed in radial alignment with one of the locking lugs 27 on the lower end of the turret, and is closed at the outer end thereof by a screw plug 80 (FIG. 4). The inner end of the plunger 76 is provided with a gradually inclined cam surface 81 and a steeply inclined shoulder 82 which are complementary to the inclined cam surfaces 77 and shoulders 78, respectively, of the grooves 75. The plunger 76 is yieldingly biased inwardly in the bore 79, for engagement in the grooves 75, by helical compression spring 83 which is interposed between the plunger 76 and the screw plug 80 in the bore 79. During the indexing of the turret counterclockwise from one position to the next the plunger 76 is forced outwardly in the bore 79, against the resistance of the spring 83, and out of a groove 75, with which it is engaged, by the cooperative action of the cam surfaces 77 and 81 of the slot and plunger, respectively. Then as the turret is moved further on counterclockwise the spring 83 will force the plunger 76 into the next succeeding groove 75. The engagement of the shoulder 82 of the plunger 76 with the shoulder 78 of a groove 75 prevents any clockwise movement of the turret 2. The spacing of the index grooves every 30° around the periphery of the pivot section 10 of the support 1 permits the indexing of the turret 2 in 30° increments.

The support 1 is adjustably secured in fixed position to the slide or compound 85 of a machine tool by a center bolt 86, which extends upwardly through an axial bore 87, in the support 1, from a head 88 disposed in a T-slot 89 in the slide 85, and is provided with a nut 90 on the upper end thereof which is screwed down thereon into engagement with the upper end of the support 1 thereby firmly clamping the support 1 down against the slide 85.

In order to limit the upward movement of the clamping head 4, as it is rotated counter-clockwise on the threads 13, a disk stop washer 92, which overhangs the upper end of the clamping head 4, is interposed between the upper end 12 of the support 1 and the nut 90. In order to prevent the upper end of the clamping head 4 from seizing against the bottom of the washer 92 anti-friction means may be interposed between them. Balls 93 may be mounted in the upper end of the clamping head 4 which are adapted to rotatably engage the stop washer 94 as the clamping head 4 approaches the upper limit of its movement. Alternately, the balls may be mounted in the washer, as shown in the embodiment illustrated in FIG. 1. In either case, the handle lever is free to move between its limiting positions without jamming.

The upper end of the clamping head 4, the nut 90 and the stop washer 92 are protected by being enclosed within a cap 94 which is screw threaded onto the upper end of the clamping head; and in order to prevent the entrance of dirt, chips, or other extraneous matter into the clutch mechanism it is surrounded by a shield which consists of an annular sleeve 95 which is secured to the upper end of the turret and extends upwardly therefrom and a sleeve 96 which is secured to the lower end of the clamping head 4 and extends downwardly therefrom into telescopic engagement with the sleeve 95.

From the foregoing it will be apparent to those skilled in this art that I have provided a very simple and efficient mechanism for effecting the automatic or self-indexing of the tool carrying turret of a multiple tool holder, of the character described, by the back and forth movement of the actuating handle lever thereof.

It is to be understood that I am not limited to the specific construction shown and described herein as various modifications may be made therein within the spirit of the invention and the scope of the appended claims.

I claim:

1. In an apparatus of the class described,
   (a) a support for an indexable multiple tool holder of the turret type comprising a cylindrical column with an outwardly extending annular base at the bottom and external threads at the top thereof,
   (b) a turret body surrounding said column above said base, with interengaging means on said base and the bottom of said turret body for locking said body against rotary movement,
   (c) spring means between said turret body and base, normally biased to move said turret body from said base to free said interengaging means and to permit rotary movement of said turret body relative to said column,
   (d) a manually operated clamping head having a handle lever extending laterally therefrom and provided with internal threads engaging said external threads to effect both rotary movement as well as a translating movement of said head along the axis of said column, and (e) a clutch assembly between said clamping head and turret body comprising a coupling member connected to said clamping head and a pair of nested coupling members connected to said turret body in cooperative relation with said first coupling member, to permit the turret body to be unlocked and indexed to a new position in response to a rotary movement of the handle lever in one direction, and to be locked in the newly indexed position by a rotary movement of the handle lever in the reverse direction.

2. An apparatus as set forth in claim 1 wherein the threads on said column and clamping head are coarse and are so arranged that the rotary movement of said handle is in a counter-clockwise direction to rapidly unlock the turret body for indexing movement in the same direction, and the rotary movement of the handle in the reverse direction locks the turret body in the newly indexed position while preventing retrograde movement of the turret body.

3. An apparatus as set forth in claim 1, wherein said spring means comprises a plurality of spring pressed plungers within said turret body acting against the top surface of said base.

4. An apparatus as set forth in claim 2 wherein said column is provided with a plurality of circumferentially spaced indexing grooves at the level of said turret body in alignment with the interengaging means between the base and bottom of the turret body, a spring pressed plunger in said turret body in selective engagement with one of said indexing grooves, the contours of said grooves and the end of said plunger being complementary and so arranged that said turret body, when disengaged from the base, is free to rotate on said column in a counterclockwise direction but is locked against movement in the reverse direction.

5. An apparatus as set forth in claim 4 wherein the complementary surfaces of the indexing grooves and said end of said plunger, which permit camming movement in one direction and blocking movement in the other direction, are approximately 45° and 10°, respectively, relative to a vertical central plane.

6. An apparatus as set forth in claim 4 including arresting means at the top of said column above the interengaging threads, to stop the angular travel of the handle and the translating movement of said clamping head.

7. An apparatus as set forth in claim 4 wherein said column is hollow and includes:
(a) means for fixedly mounting said cylindrical column on a lathe compound comprising a central bolt extending through said column and a retaining nut therefor above said movable clamping head,
(b) a stop washer retained by said nut and overhanging said clamping head, adapted to arrest the translating movement thereof, and
(c) anti-friction means between the top of said clamping head and washer to prevent seizing therebetween.

8. An apparatus as set forth in claim 7 wherein anti-friction balls are mounted in at least one of the contacting members consisting of the clamping head and stop washer.

9. An apparatus as set forth in claim 4 wherein the handle is capable of executing a movement of approximately 120°, to permit a selective positioning of the turret body in a plurality of incrementally disposed indexed positions.

10. An apparatus as set forth in claim 4 wherein the indexing grooves are equally spaced circumferentially at 30° intervals, and said handle lever is capable of executing a movement of approximately 120° in the forward direction to permit a selective positioning of the turret body at positions spaced 30°, 60° or 90° from the previous position, preparatory to the movement of the handle in the reverse direction to lock the turret body in its selected indexed position.

11. An apparatus as set forth in claim 1 wherein:
(a) said first coupling member on said head is provided with a plurality of circumferentially spaced camming lugs,
(b) said nested coupling members having a plurality of indentations complementary to said camming lugs, and
(c) a circumferential slot in the inner one of said nested members, and an activating pin mounted on said first coupling member extending thereinto to provide a lost-motion between the coupling members during the initial travel of the clamping head in its to-and-fro movements.

12. An apparatus as set forth in claim 11 including means for adjusting the initial relative displacement between the first coupling member connected to said clamping head and the nested coupling members connected to said turret body.

13. An apparatus as set forth in claim 12 wherein said first coupling member is connected to said clamping head through the intermediary of a plurality of interdigitating radial tongues and slots in said respective members capable of adjustable angular displacement.

14. An apparatus as set forth in claim 12 wherein the outer periphery of the outer one of said nested coupling members is provided with serrations along at least a limited area thereof, and a plunger extending through said turret body with the end thereof having serrations for locking said nested coupling members at a predetermined angular position in said turret body.

15. An apparatus as set forth in claim 14 wherein said serrations on the outer coupling member and said plunger are complementary and extend in parallel to each other.

16. An apparatus as set forth in claim 11 wherein a protective sleeve extends beyond the pair of nested coupling members in said turret body, and a protective hood extends from the free end of said clamping head in overlapping relation to said sleeve, for excluding foreign matter from said clutch components.

17. An apparatus as set forth in claim 11 wherein said nested coupling members comprise an outer clutch ring which is secured to the upper end of said turret body and is provided with an inwardly extending annular flange at the lower end thereof, the inner one of said nested members consisting of a clutch ring which is rotatably mounted within said outer clutch ring with the lower end thereof seated on said flange and the upper end thereof flush with the upper end of said outer clutch ring, said first coupling member mounted on the lower end of said clamping head having the outer wall thereof disposed in vertical alignment with the outer wall of said outer clutch ring, and the inner wall thereof disposed in vertical alignment with the inner wall of said inner clutch ring, said plurality of indentations formed in the upper ends of said outer and inner clutch rings being equally spaced and each provided with a vertical shoulder and an upwardly and rearwardly inclined surface, said camming lugs on said first coupling member being equal in number and shaped and spaced complementarily to the said indentations, said lugs being operative to engage the upper ends of said outer and inner clutch rings to force said turret body downwardly against the resistance of said spring means into locking engagement with said base, the arrangement of said lost-motion connection between said first coupling member and the inner clutch ring with respect to the indentations in the upper end thereof being such that during the initial movement of said clamping head and first coupling member in said one direction, said camming lugs are moved into vertical alignment with the indentations in said inner clutch ring at which time said activating pin picks up said last-mentioned clutch ring and rotates it in unison with the first coupling member until the indentations in the inner and outer clutch rings are in radial alignment with each other and said lugs are in vertical alignment with said last-mentioned indentations, thereby permitting said spring means to force said turret body out of locking engagement with said base until the said indentations in said clutch rings interengage with said camming lugs, whereupon further movement of said clamping head will index said turret body to a new position, and movement of said clamping head and coupling member in the reverse direction will cam said turret body into locking engagement with said base and rotate only said inner clutch ring until the indentations therein are out of radial alignment with the indentations in said outer clutch ring.

18. An apparatus as set forth in claim 17 wherein the indentations in the upper ends of the inner and outer clutch rings and the complementary lugs in the coupling member are four in number and displaced substantially 90° from each other.

References Cited

UNITED STATES PATENTS 3,158,920  12/1964  Bollman _____ 29—35.5
3,137,916   6/1964  Leafquist _____ 29—35.5
2,773,298  12/1956  Bruet _____ 29—35.5

RICHARD H. EANES, Jr., Primary Examiner

U.S. Cl. X.R.

74—826; 82—31